(12) United States Patent
Peek et al.

(10) Patent No.: US 10,951,054 B2
(45) Date of Patent: Mar. 16, 2021

(54) WIRELESS CHARGING DEVICE FOR ELECTRONIC DEVICE (71) Applicant: Intel Corporation, Santa Clara, CA (US)

(72) Inventors: Gregory A. Peek, Northplains, OR (US); Mark R. Francis, Portland, OR (US); Torrey W. Frank, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/421,866

(22) Filed: May 24, 2019

(65) Prior Publication Data
US 2020/0106289 A1    Apr. 2, 2020

Related U.S. Application Data (63) Continuation of application No. 15/838,255, filed on Dec. 11, 2017, now Pat. No. 10,305,316, which is a continuation of application No. 14/142,785, filed on Dec. 28, 2013, now Pat. No. 9,843,214.

(51) Int. Cl.
| H02J 7/00 | (2006.01) |
| H02J 7/02 | (2016.01) |
| H02J 50/90 | (2016.01) |
| H02J 50/80 | (2016.01) |
| H02J 50/12 | (2016.01) |
| H02J 50/10 | (2016.01) |
| H02J 50/05 | (2016.01) |

(52) U.S. Cl.
CPC ............ *H02J 7/025* (2013.01); *H02J 7/0042* (2013.01); *H02J 50/80* (2016.02); *H02J 50/90* (2016.02); *H02J 7/00034* (2020.01); *H02J 50/05* (2016.02); *H02J 50/10* (2016.02); *H02J 50/12* (2016.02)

(58) Field of Classification Search
CPC ....................................................... H02J 7/00
See application file for complete search history.

(56) References Cited

U.S. PATENT DOCUMENTS

| D416,536 S | 11/1999 | Ross et al. |
| D469,439 S | 1/2003 | Bradley |
| D469,774 S | 2/2003 | Bradley |
| (Continued) | | |

OTHER PUBLICATIONS

United States Patent and Trademark Office, "Notice of Allowance and Fee(s) Due", issued in connection with U.S. Appl. No. 29/477,905 dated Oct. 3, 2014, 10 pages.

(Continued)

*Primary Examiner* — Robert Grant
(74) *Attorney, Agent, or Firm* — Hanley, Flight & Zimmerman, LLC (57) ABSTRACT Systems and methods may provide for wireless charging device of an electronic device powered by a rechargeable battery. The wireless charging device may include a charging station having a charging surface with a power transmitter and a contour that concentrically interfaces with a corresponding contour of an inner surface of the electronic device in a manner that facilitates an initiation of a power charging sequence at the charging surface when the charging station detects an operational coupling between the power transmitter and a power receiver of the electronic device.

20 Claims, 11 Drawing Sheets (56) References Cited

U.S. PATENT DOCUMENTS

| | | | |
|---|---|---|---|
| D489,322 S | 5/2004 | Sawai et al. | |
| D568,327 S | 5/2008 | Fitch et al. | |
| D568,808 S | 5/2008 | Hamasaki | |
| D572,188 S | 7/2008 | Prat-Pfister | |
| D588,141 S | 3/2009 | Heggland et al. | |
| D588,985 S | 3/2009 | O'Hern | |
| 7,710,071 B2 | 5/2010 | Rodarte | |
| D621,346 S | 8/2010 | Navid | |
| D657,740 S | 4/2012 | Prat-Pfister | |
| 8,335,545 B2 * | 12/2012 | Ham | G06F 1/1632 379/428.02 |
| 8,497,659 B2 | 7/2013 | Navid | |
| D691,947 S | 10/2013 | Cole et al. | |
| D692,376 S | 10/2013 | Palmer et al. | |
| 10,305,316 B2 | 5/2019 | Peek et al. | |
| 2008/0234009 A1 | 9/2008 | Zeiger et al. | |
| 2009/0102419 A1 | 4/2009 | Gwon et al. | |
| 2011/0050164 A1 | 3/2011 | Partovi et al. | |
| 2011/0234154 A1 | 9/2011 | Navid | |
| 2012/0274589 A1 | 11/2012 | De Angelo | |
| 2013/0143519 A1 * | 6/2013 | Doezema | G08B 21/043 455/404.2 |
| 2015/0188352 A1 | 7/2015 | Peek et al. | |
| 2016/0028266 A1 | 1/2016 | Madau et al. | |

OTHER PUBLICATIONS

United States Patent and Trademark Office, "Notice of Allowance and Fee(s) Due", issued in connection with U.S. Appl. No. 29/513,783 dated Jul. 2, 2015, 11 pages.

United States Patent and Trademark Office, "Non-Final Office Action", issued in connection with U.S. Appl. No. 14/142,785 dated Dec. 31, 2015, 17 pages.

United States Patent and Trademark Office, "Final Office Action", issued in connection with U.S. Appl. No. 14/142,785 dated Jul. 11, 2016, 19 pages.

United States Patent and Trademark Office, "Non-Final Office Action", issued in connection with U.S. Appl. No. 14/142,785 dated Jan. 9, 2017, 22 pages.

United States Patent and Trademark Office, "Final Office Action", issued in connection with U.S. Appl. No. 14/142,785 dated May 1, 2017, 18 pages.

United States Patent and Trademark Office, "Notice of Allowance and Fee(s) Due", issued in connection with U.S. Appl. No. 14/142,785 dated Aug. 9, 2017, 10 pages.

United States Patent and Trademark Office, "Notice of Allowability", issued in connection with U.S. Appl. No. 14/142,785 dated Aug. 30, 2017, 2 pages.

United States Patent and Trademark Office, "Notice of Allowance and Fee(s) Due", issued in connection with U.S. Appl. No. 15/838,255 dated Jan. 15, 2019, 9 pages.

* cited by examiner

WIRELESS CHARGING DEVICE FOR ELECTRONIC DEVICE

RELATED APPLICATIONS

This patent arises from a continuation of U.S. application Ser. No. 15/838,255 (now U.S. Pat. No. 10,305,316), titled "Wireless Charging Device for Electronic Device," filed Dec. 11, 2017, which is a continuation of U.S. application Ser. No. 14/142,785 (now U.S. Pat. No. 9,843,214), titled "Wireless Charging Device for Electronic Device," filed Dec. 28, 2013, both of which are hereby incorporated by reference in their entireties.

TECHNICAL FIELD

Embodiments generally relate to wireless charging devices, and more particularly, to wireless charging devices having a docking area that is concentrically aligned with and conforms to a contour of the inner surface of an electronic device that is powered by an internal rechargeable battery.

BACKGROUND

An electronic device, such as for example, a wearable electronic device that is powered by a rechargeable battery, may often require frequent recharging of the battery. Such a wearable electronic device may take the form of, for example, a bracelet, watch or smart watch to be worn on the wrist, forearm and/or the ankle of a wearer. The wearable electronic device may be generally charged by a cable such as, for example, a DC voltage cable or a USB cable. Such a cable may require, however, a male or female connector having a specific size and geometric structure that interfaces with the device.

Some consumer devices, such as, for example, smart phones and wearable devices, may be charged wirelessly using a charging pad having a charging surface that is generally flat. Use of a charging pad having a generally flat charging surface may require, however, orienting the device in a manner such that its inductive coils or RF receiver is aligned with the inductive coils or RF transmitter of the charging pad. Such a design may be unsuitable for a wearable device worn on the wrist, forearm and/or the ankle of a wearer due to the structural geometry of the device not being equipped with broad, flat surfaces to contain a coil or antenna.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
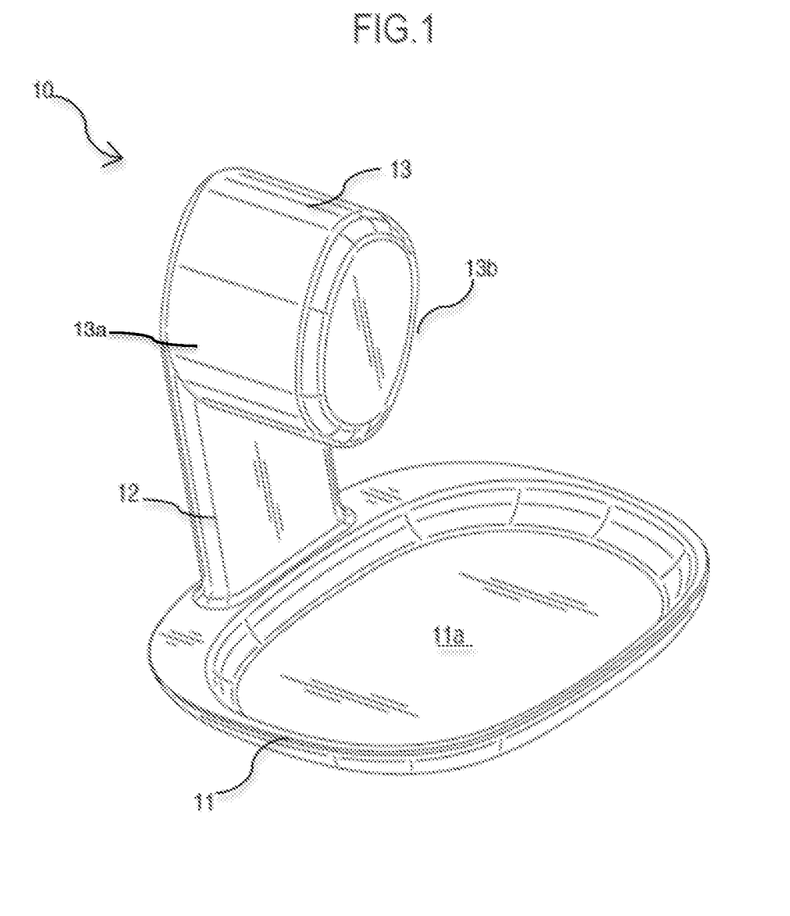
FIG. 1 is a perspective view of an example of a wireless charging device, in accordance with embodiments.

As illustrated in the FIG. 1, embodiments are related to an example of a wireless charging device 10 configured to charge an internally-arranged rechargeable battery of an electronic device 20. The wireless charging device 10 may include a support base 11, a support post 12 and a charging station 13 having a docking area or charging surface 13a upon which is supported the electronic device 20 in order to recharge the battery of the electronic device 20 during a power charging sequence. The outer structural components of the wireless charging device 10 may be composed of lightweight, non-conductive material such as, for example, a polymeric material. Embodiments, however, are not limited to the use of a polymeric material, and thus, may include other lightweight, non-conductive materials.

Figure 2:
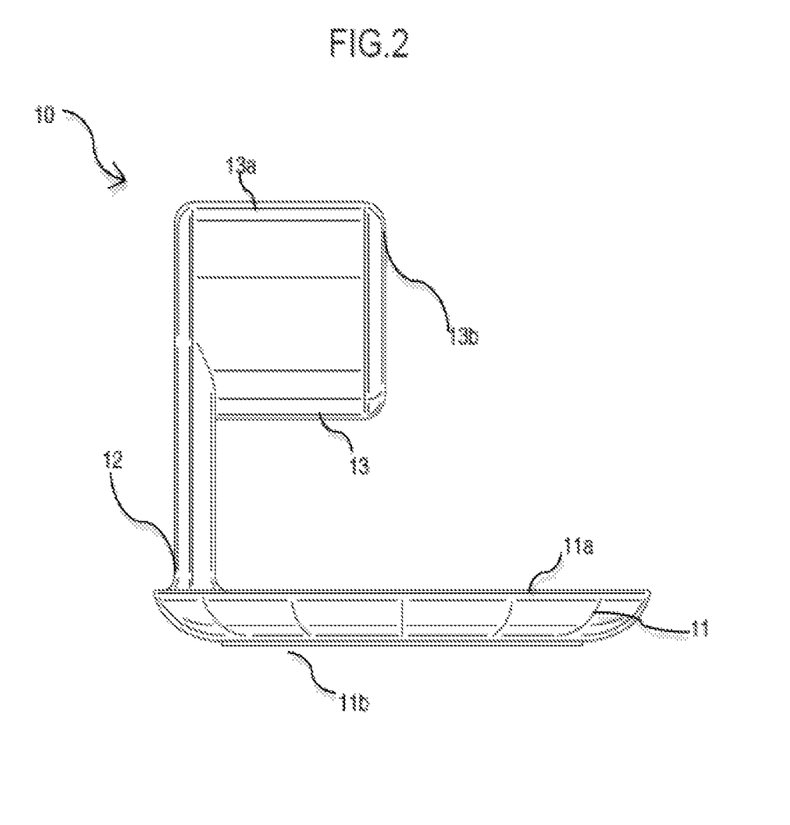
FIGS. 2 and 3 are side views of examples of a wireless charging device, in accordance with embodiments.
Figure 3:
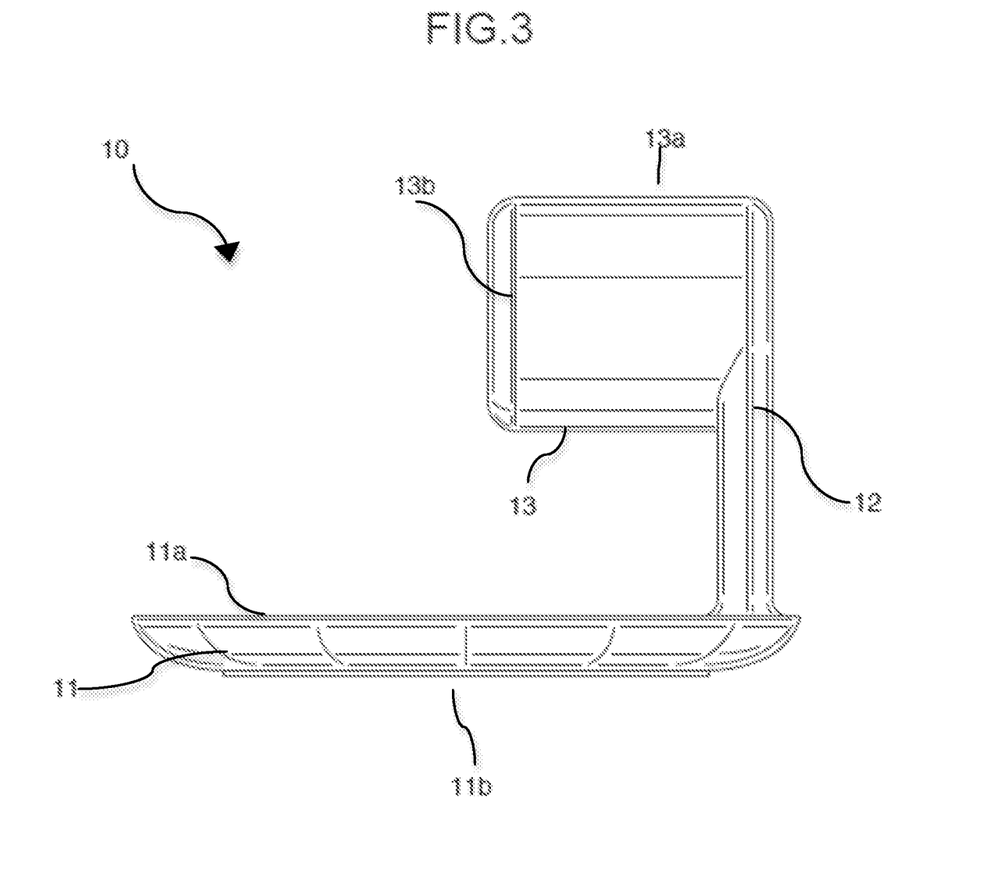
Figure 7:
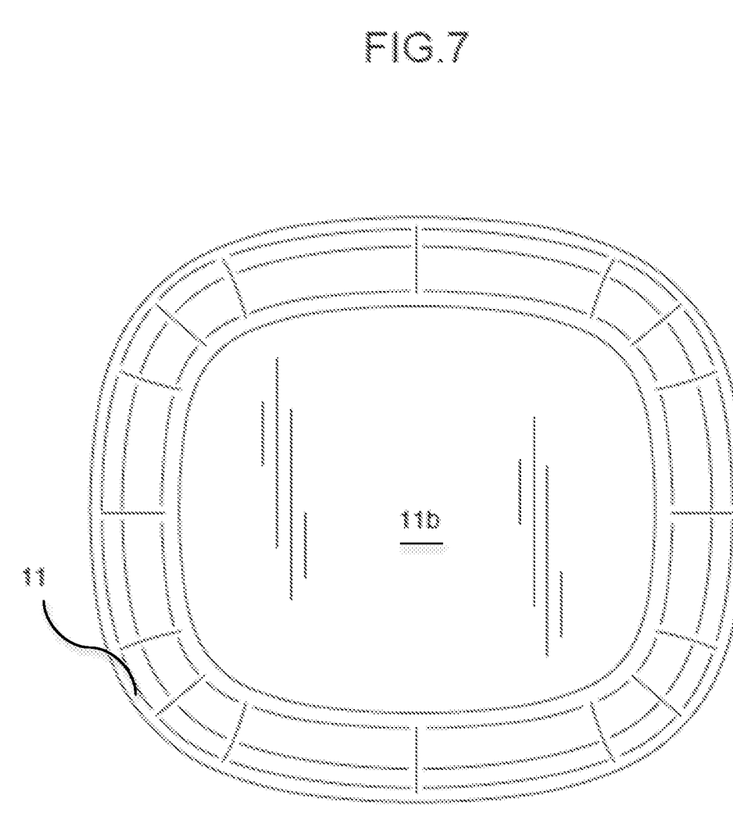
FIG. 7 is a bottom view of an example of a wireless charging device, in accordance with embodiments.

As illustrated in FIGS. 2, 3 and 7, the support base 11 may have a concave upper surface 11a upon which various items may be supported. The support base 11 may have a generally flat or horizontally extending bottom surface 11b which permits the wireless charging device 10 to be supported on a surface such as, for example, a desktop, table, floor, etc. An outlet configured to operatively interface the wireless charging device 10 with an external power source may be provided at the bottom surface 11b.

Figure 4:
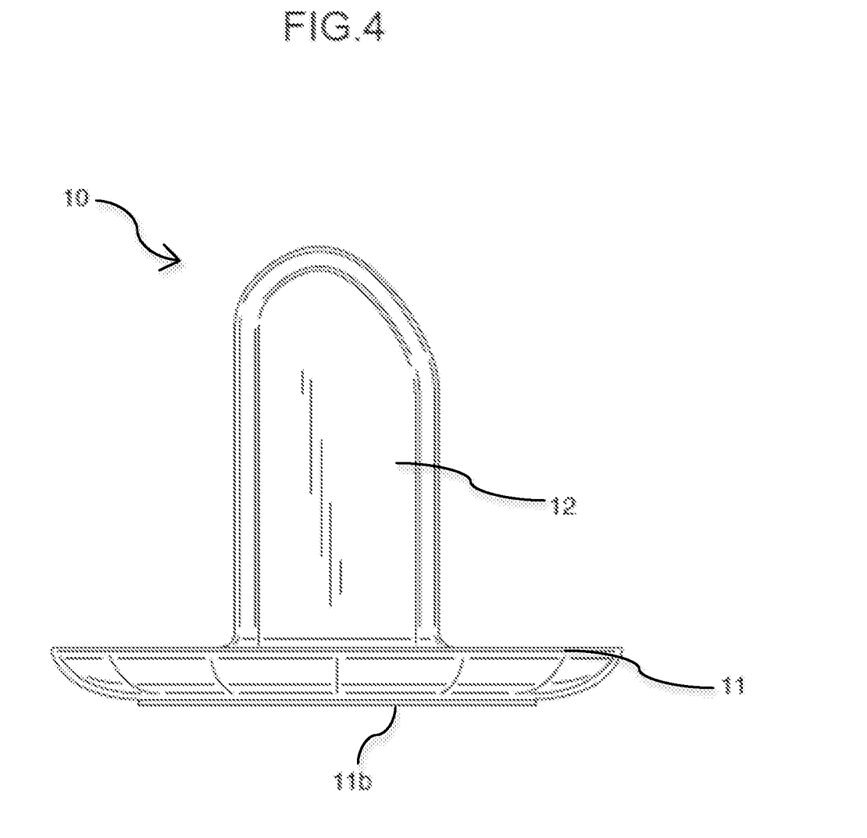
FIG. 4 is a rear view of an example of a wireless charging device, in accordance with embodiments.

As illustrated in FIG. 4, the support post 12 may extend at an angle from the support base 11, For instance, the support post 12 may extend in a plane which is perpendicular to the plane in which the support base 13 extends. Embodiments are not limited to any specific angle, and thus, embodiments may be provided such that the support post 12 extends from the support base 13 at any angle that permits a charging sequence to be initiated. A external power source may operatively interface with the wireless charging device 10 at the support post 12.

Figure 5:
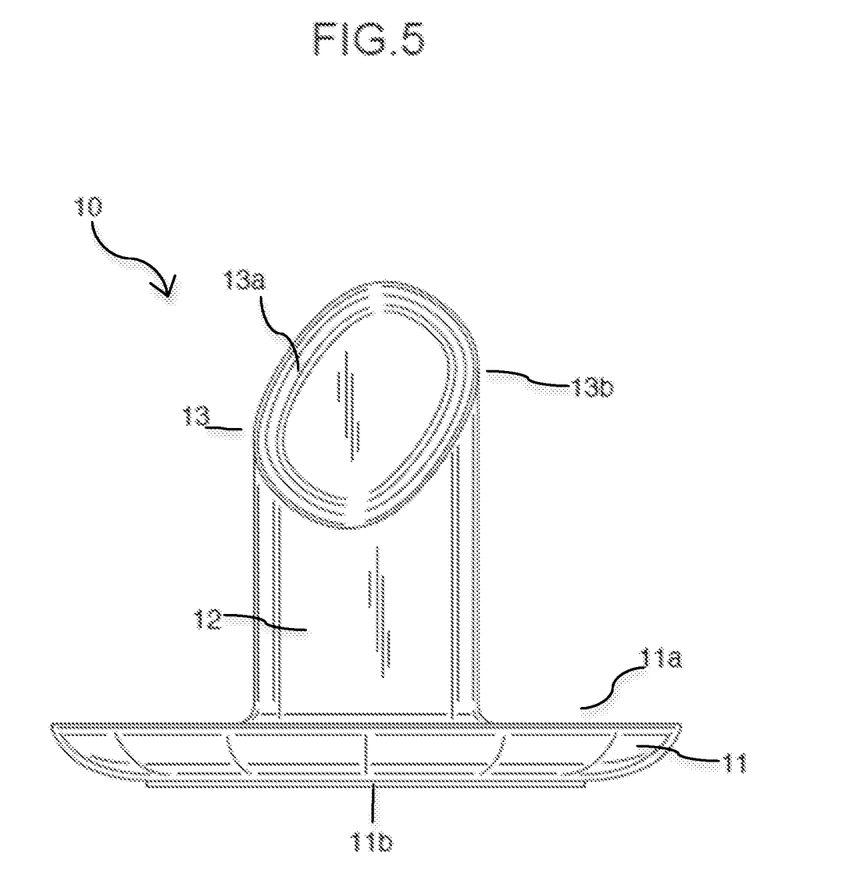
FIG. 5 is a front view of an example of a wireless charging device, in accordance with embodiments.
Figure 6:
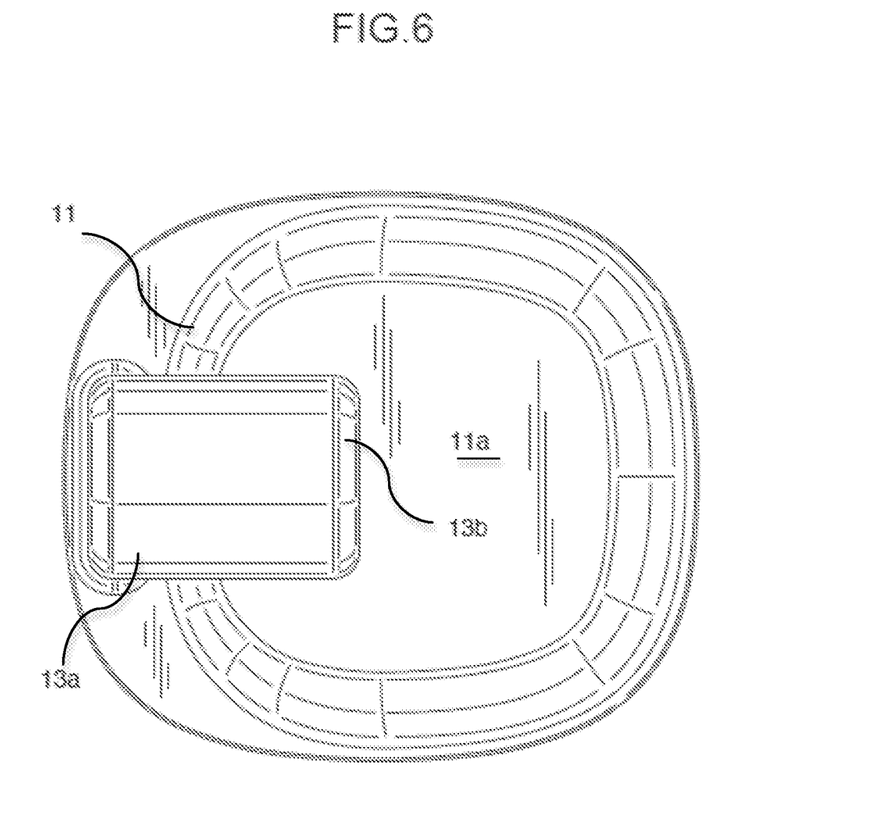
FIG. 6 is a top view of an example of a wireless charging device, in accordance with embodiments.

As illustrated in FIGS. 5 and 6, the charging station 13 is arranged at a distal end of the support post 12 in a vertically spaced-apart manner from the support base 11. The charging station 13 may extend at an angle from the support post 12. For instance, the charging station 13 may extend in a plane which is perpendicular to the plane in which the support post 12 extends from the support base 11. Embodiments are not limited to any specific angle, and thus, embodiments may be provided such that the charging station 13 extends from the support post 12 at any angle that permits a charging sequence to be initiated.

Figure 8:
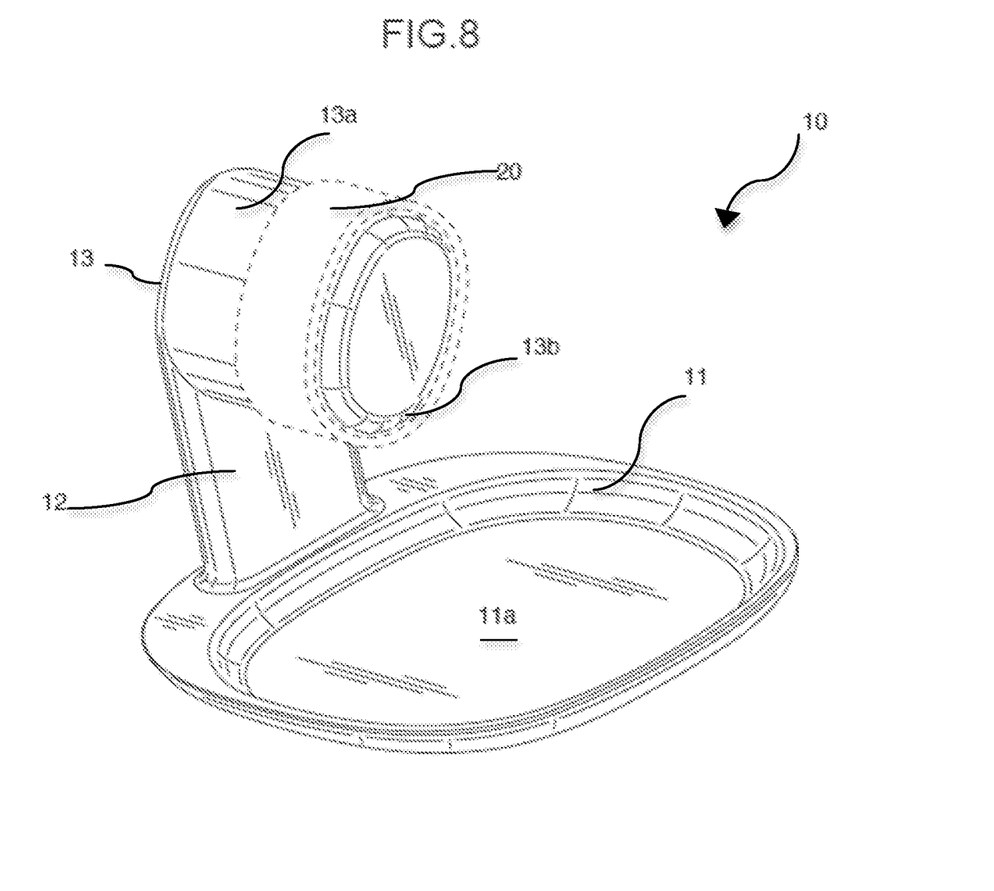
FIG. 8 is a perspective view of an example of a wearable electronic device docked on the wireless charging device, in accordance with embodiments.

As further illustrated in FIGS. 5 and 8, the charging station is spatially offset relative to a vertical axis of the support post 12 in order to orient the electronic device 20 in a correct docking position at the charging surface 13a, which thus operatively couples the power transmitter 13c to the receiver of the electronic device 20 during a power charging sequence. Spacing between the support base 11 and the charging station 13 is provided so as to permit the wearable electronic device 20 to be concentrically received on the charging surface 13a. The wearable electronic device 20 may be received on the charging station 13 to permit charging (e.g., inductive, conductive, resonance) of its internal battery. The wearable electronic device 20 may have, for example, a generally circular or elliptical shape or cross-section. For instance, the electronic device 20 may be a wearable electronic device 20 such as, for example, a bracelet, watch, smart watch, etc. to be worn on and/or about the wrist, forearm and/or the ankle of a wearer. The wearable electronic device 20 may generally have a display that displays, during normal function of the device 20, certain data, indicia, information, etc.

The charging station 13 may have a size, shape, cross-section or geometric configuration which corresponds generally to the size, shape, cross-section or geometric configuration of the electronic device 20 and/or the body part upon which the wearable electronic device 20 may be worn. For instance, for an electronic bracelet, watch or smart watch which is worn generally on the wrist, the charging station 13 may have a size and a shape which corresponds generally to the size and shape of a human wrist. Such a shape may generally take the form of a circular trapezoid. In this way, the charging surface 13a of the charging station 13 may be concentrically aligned with and conform to an outer contour of the inner surface of the wearable electronic device 20. The geometric shape of the charging station 13 also permits the wearable electronic device 20, when docketed at the charging station 13, to be positioned such that certain data, indicia, information, etc. which is displayed on a display of the wearable electronic device 20 may be easily seen by a user. For example, a wearable electronic device 20 having a display of the time may be used as an alarm clock when docked at the charging station 13.

Internally provided at the charging station 13 is a power transmitter, such as an coil or antenna, that outputs energy received by a corresponding receiving coil or antenna in the wearable electronic device 20 during a charging sequence when the wearable electronic device 20 is correctly aligned with the charging surface 13a.

Figure 9:
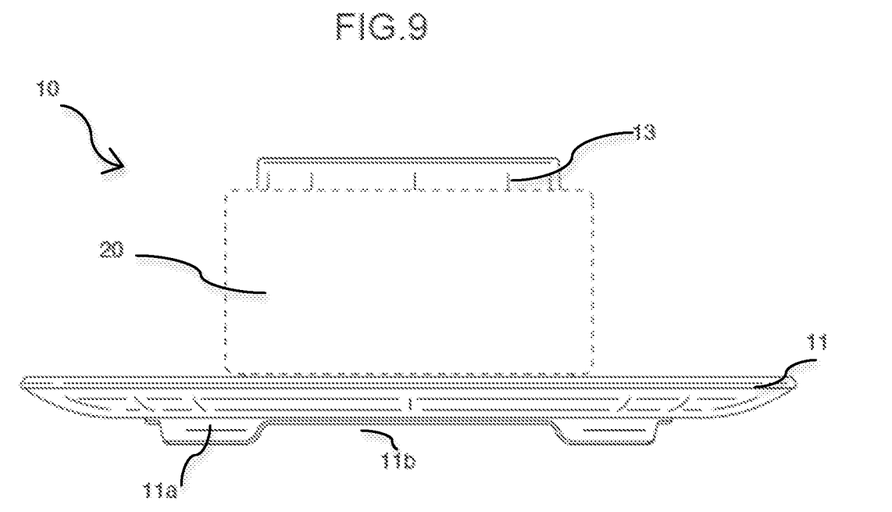
FIG. 9 is a perspective view of another example of a wireless charging device, in accordance with embodiments.

As illustrated in FIG. 9, another example of a wireless charging device 10 in accordance with embodiments may include a support base 11 and a charging station 13 which extends from the support base 11 in a plane which is perpendicular to the plane in which the support base 11 extends.

Figure 10:
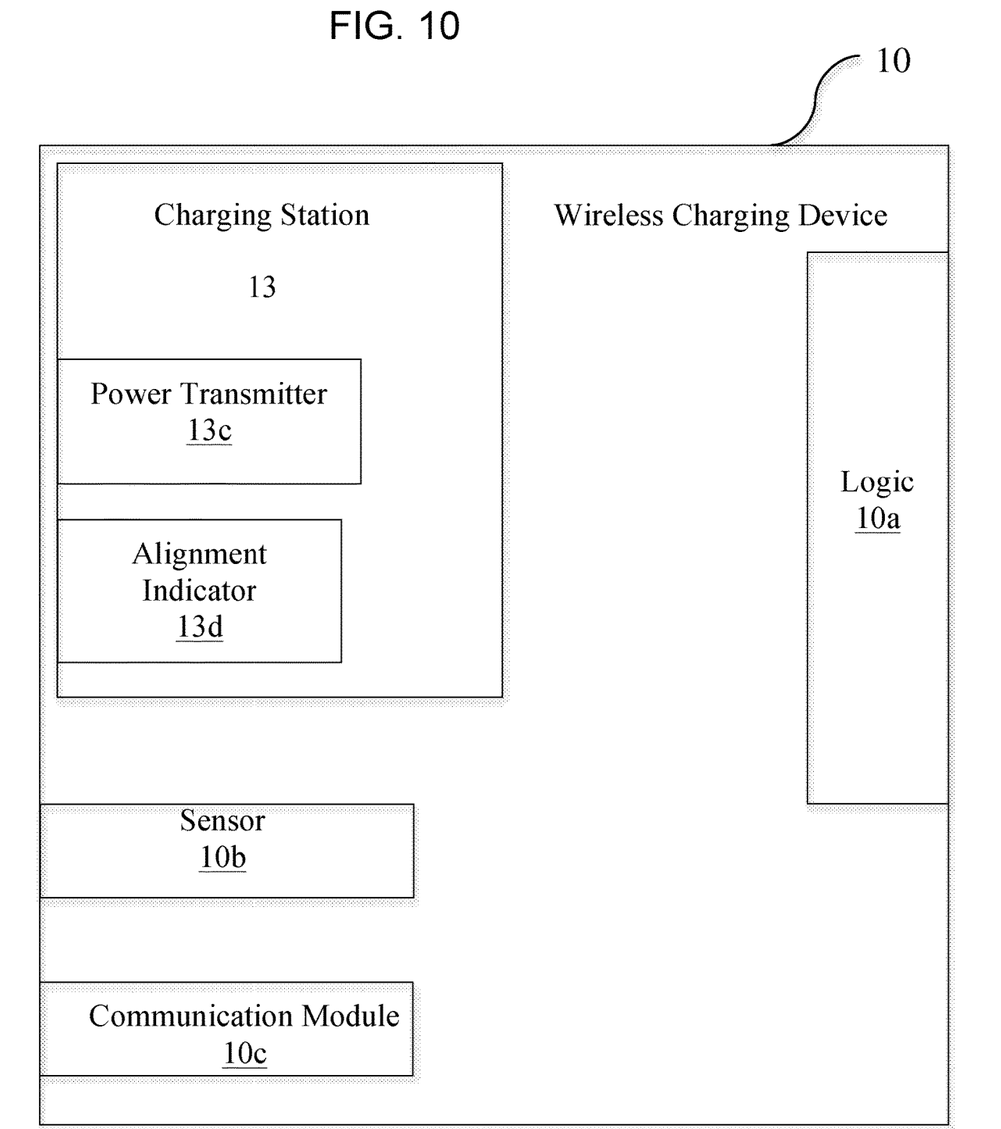
FIG. 10 is a block diagram of an example of a wireless charging device, in accordance with embodiments.

As illustrated in FIG. 10, internally arranged in at least one of the support base 11, the support post 12 and the charging station 13 is various electric circuitry and other components which may perform wireless and/or non-wireless control of at least one operational feature the wearable electronic device 20. For instance, the wireless charging device 10 may include logic 10a and one or more sensors 10b operatively connected thereto for proximity detection and/or motion detection. For instance, when the wearable electronic device 20 is in a correct docking position, i.e., a correct operational coupling between charging station 13 and the wearable electronic device 20, on the charging station 13, the user may use the wearable electronic device 20 to perform various operative functions such as, for example, as an alarm clock or a light source. In order to selectively activate or deactivate one of these operative functions, a user may motion a hand (or other body part) within the range of the one or more sensors 10b, which sends a signal to the logic 10a to selectively activate or deactivate the light source, or turn off the alarm (or snooze function).

In this way, certain operative functions of the wearable electronic device 20 may be controlled by non-physical contact between the user, the electronic device 20 and/or the wireless charging device 10. Alternatively or in addition to, the support base 11 may be provided with a control knob or button that permits a user to manipulate the control knob or button in order to selectively activate or deactivate one of the operative functions of the wearable electronic device 20.

The logic 10a may also be configured to detect the location of the power receiver(s) of the wearable electronic device 20 relative to the charging surface 13a of the charging station 13. In this way, the logic 26 may selectively activate the power transmitter to initiate a power charging sequence at the charging surface when an operational coupling between the power transmitter 13c and a power receiver of the electronic device is detected. In that way, correct operational alignment between the power transmitter 13c and the power receiver automatically activates the power charging sequence. A user may receive audio or visual confirmation of the operational coupling between the power transmitter 13c and the receiver of the electronic device via an alignment indicator 13d. The indicator 13d may also provide an indication of a charging status.

The wireless charging device 10 may also include a communication module 10c which syncs data to or firmware updates (e.g., writes new firmware code to) the electronic device 13 when a correct operational coupling of the electronic device 13 at the charging surface 13a of the charging station 13 is detected.

Figure 11:
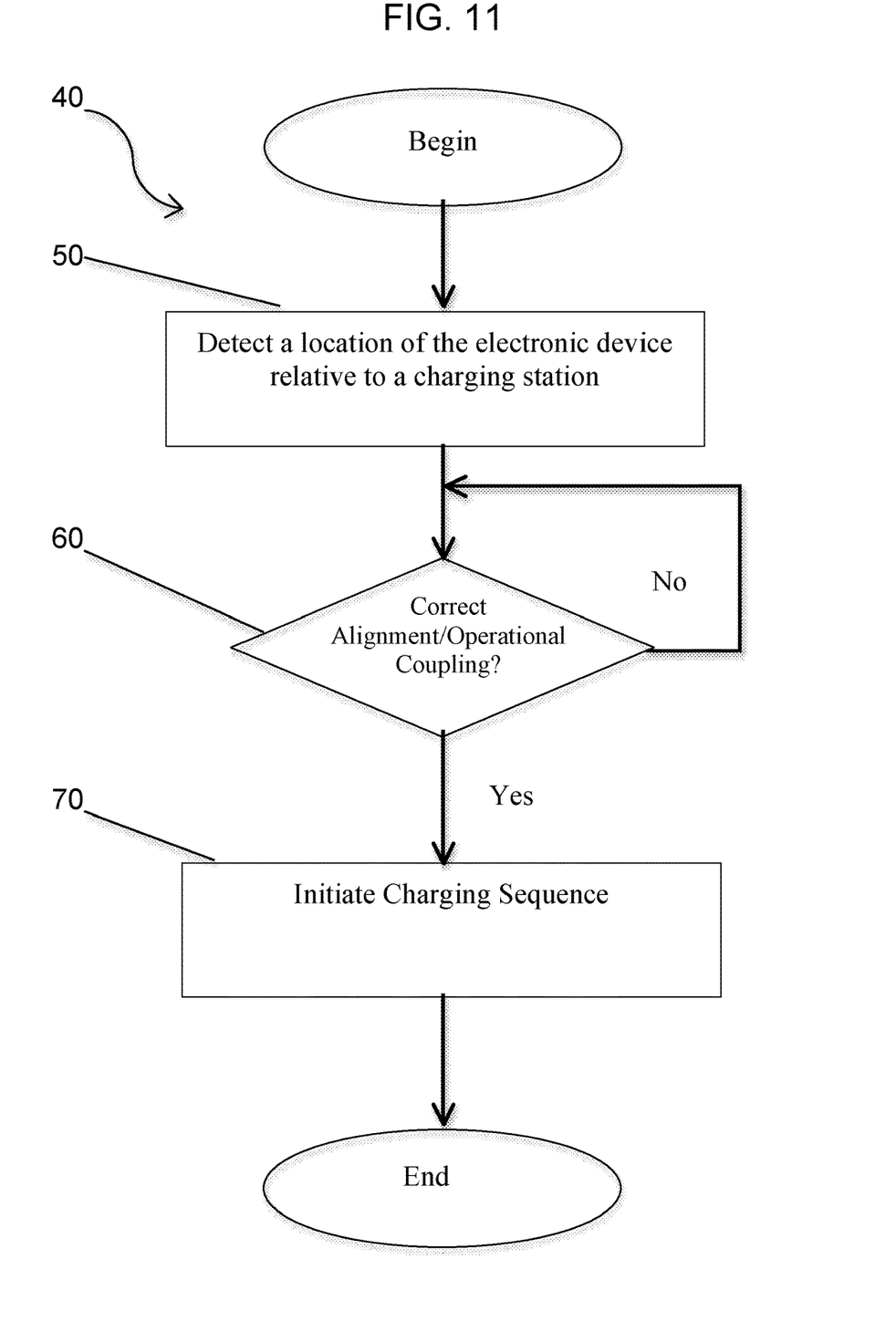
FIG. 11 is a flowchart of an example of a method of wirelessly charging an electronic device, in accordance with embodiments.

As illustrated in FIG. 10, a method 40 of wirelessly charging an electronic device is provided. The method 40 in accordance with embodiments may be implemented as a set of logic and/or firmware instructions stored in a machine- or computer-readable storage medium such as random access memory (RAM), read only, memory (ROM), programmable ROM (PROM), flash memory, etc., in configurable logic such as, for example, programmable logic arrays (PLAs), field programmable gate arrays (FPGAs), complex programmable logic devices (CPLDs), in fixed functionality logic hardware using circuit technology such as, for example, application specific integrated circuit ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as Java, Smalltalk, C++ or the like and conventional procedural programming languages, such as the "C" programming language or similar programming languages. In accordance with embodiments, the method 40 may be implemented in the logic 10a of the wireless charging device 10, as already discussed herein.

Illustrated processing block 50 detects the location of an electronic device relative to a charging station having a charging surface with a contour. As already noted herein, the charging surface may also include a power transmitter. In one example, block 50 may use a low power signal and acknowledgement handshake to detect the location of the adjacent power receiver of the electronic device.

At block 60, may provide for determining whether the electronic device is aligned properly at the docket area of the charging station (i.e., an operational coupling between a corresponding contour of an inner surface of the electronic device and the contour of the charging surface is detected). At block 70, an affirmation of proper alignment initiates a power charging sequence at the charging surface of the charging station. This may be conducted by transmitting a charge signal to at least one region of the charging surface. visual and/or audio indication of the affirmation indicating the operational coupling between a power transmitter and a receiver of the electronic device may be provided.

If, however, the electronic device is not aligned properly at the docket area of the charging station (i.e., an operational coupling between a corresponding contour of an inner surface of the electronic device and the contour of the charging surface is not detected), the method returns to block 60 until proper alignment is detected.

Additional Notes and Examples

Example One may include a wireless charging device, comprising: a charging station having a charging surface with a power transmitter and a contour that concentrically interfaces with a corresponding contour of an inner surface of an electronic device powered by a rechargeable battery, the charging station to initiate a power charging sequence at the charging surface when the charging station detects an operational coupling between the power transmitter and a power receiver of the electronic device.

Example Two may include the wireless charging device of Example One, and further comprise a base and a post extending from the base and from which the charging station extends.

Example Three may include the wireless charging device of Example One, wherein the charging station is spatially offset relative to a vertical axis of the post to orient the electronic device in a docking position which operatively couples the power transmitter to the receiver of the electronic device during the power charging sequence.

Example Four may include the wireless charging device of Example Three, wherein the charging station has an indicator that indicates the operational alignment between the power transmitter and the receiver of the electronic device.

Example Five may include the wireless charging device of Example One, and further comprises a base from which the charging station extends and upon which the electronic device is supported.

Example Six may include the wireless charging device of Example One, wherein the charging station has a communication module which operatively interfaces in a closed loop manner with the electronic device.

Example Seven may include the wireless charging device of any one of Examples One to Three, and further comprises a sensor configured to detect a movement by a user which facilitates a wireless control of at least one operational feature of the electronic device.

Example Eight may include the wireless charging device of Example Seven, wherein the wireless control comprises a non-physical contact between the user and at least one of the electronic device and the wireless charging device.

Example Nine may include the wireless charging device of Example Seven, and further comprises a control module configured to permit a wireless control of at least one operational feature of the electronic device via physical contact between the user and the wireless charging device.

Example Ten may include the wireless charging device of Example One, wherein the power transmitter is arranged to transmit a charge signal to at least one region of the charging surface.

Example Eleven may include at least one computer readable storage medium comprising a set of instructions which, if executed by a wireless charging device, cause the wireless charging device to detect a location of an electronic device relative to a charging station having a charging surface with a contour, and initiate a power charging sequence at a charging surface of the charging station when operational coupling between a corresponding contour of an inner surface of the electronic device and the contour of the charging surface is detected.

Example Twelve may include the least one computer readable storage medium of Example Eleven, wherein the instructions, if executed, cause the wireless charging device to transmit a charge signal to at least one region of the charging surface when the power charging sequence is initiated.

Example Thirteen may include the least one computer readable storage medium of Example Eleven, wherein the instructions, if executed, cause the wireless charging device to indicate the operational coupling between a power transmitter and a receiver of the electronic device.

Example Fourteen may include the least one computer readable storage medium of Example Eleven, wherein the instructions, if executed, cause the wireless charging device to sync data to or firmware update the electronic device when the electronic device is in a docking position on the charging station.

Example Fifteen may include the least one computer readable storage medium of Example Eleven, wherein the instructions, if executed, cause the wireless charging device to detect a movement by a user which facilitates a wireless control of at least one operational feature of the electronic device.

Example Sixteen may include the least one computer readable storage medium of Example Fifteen, wherein the wireless control comprises a non-physical contact between the user and at least one of the electronic device and the wireless charging device.

Example Seventeen may include the least one computer readable storage medium of Example Eleven, wherein the instructions, if executed, cause the wireless charging device to wirelessly control of at least one operational feature of the electronic device via physical contact between the user and the wireless charging device.

Example Eighteen may include a method of wirelessly charging an electronic device, comprising detecting a location of the electronic device relative to a charging station having a charging surface with a contour, and initiating a power charging sequence at the charging station when an operational coupling between a corresponding contour of an inner surface of the electronic device and the contour of the charging surface is detected.

Example Nineteen may include the method of Example Eighteen, wherein initiating the power charging sequence comprises transmitting a charge signal to at least one region of the charging surface when the power charging sequence is initiated.

Example Twenty may include the method of any one of Examples Eighteen or Nineteen, further comprising indicating the operational coupling between a power transmitter and a receiver of the electronic device.

Example Twenty-One may include the method of Example Eighteen, further comprising syncing data to or firmware updating the electronic device when the electronic device is in a docking position on the charging station.

Example Twenty-Two may include the method of any one of Examples Eighteen or Nineteen, wirelessly controlling at least one operational feature of the electronic device by detecting a movement by a user.

Example Twenty-Three may include the method of Twenty-Two, wherein the wirelessly controlling the at least one operational feature of the electronic device comprises a non-physical contact between the user and at least one of the electronic device and the wireless charging device.

Example Twenty-Three may include the method of Example Eighteen, further comprising wirelessly controlling at least one operational feature of the electronic device via physical contact between the user and the wireless charging device.

Example Twenty-Two may include a wireless charging device comprising means for performing the method of any one of Examples Eighteen to Twenty-three.

Embodiments are applicable for use with all types of battery powered devices, such as, for example, a smart phone, mobile Internet device (MID), smart tablet, convertible tablet, notebook computer, or other similar portable device.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A dock for charging a battery of a wearable electronic device, the dock comprising:
    a base to support the dock on a support surface;
    a post extending away from the base; and
    a charging station extending from and suspended by the post such that the charging station is disposed over the base and a space is between the charging station and the base, the charging station having a charging surface to support the wearable electronic device, the charging surface askew relative to the base such that a display of the wearable electronic device faces toward a user when the wearable electronic device is supported on the charging surface, the charging station including an electromagnetic charger to inductively charge the battery of the wearable electronic device while the wearable electronic device is supported on the charging surface.

2. The dock of claim 1, wherein the post is perpendicular to the base.

3. The dock of claim 2, wherein the charging station is perpendicular to the post.

4. The dock of claim 1, wherein the charging station is adjacent the post.

5. The dock of claim 1, wherein the charging station has a circular cross-section.

6. The dock of claim 1, wherein the charging station has a shape that corresponds to a body part upon which the wearable electronic device is to be worn.

7. The dock of claim 6, wherein the body part is a human wrist.

8. The dock of claim 1, wherein the charging station has a shape corresponding to a wrapped watch band.

9. The dock of claim 1, wherein the wearable electronic device is a smart watch.

10. The dock of claim 1, further including circuitry disposed in the base to deliver current to the charging station.

11. A dock for charging a battery of a wearable electronic device, the dock comprising:
    a base to support the dock;
    a post cantilevered from the base; and
    a charging station extending essentially parallel to the base from a distal end of the post such that the base is disposed below the charging station, the charging station having a charging surface to support the wearable electronic device, the charging surface askew relative to the base such that a display of the wearable electronic device faces toward a user when the wearable electronic device is supported on the charging surface to facilitate reading the display, the charging station including an inductive charger to wirelessly charge the battery of the wearable electronic device while the wearable electronic device is supported on the charging surface.

12. The dock of claim 11, wherein the post extends along a plane that is perpendicular to a plane along which the base extends.

13. The dock of claim 12, wherein the charging station extends along a plane that is perpendicular to the plane along which the post extends.

14. The dock of claim 11, wherein the charging station is adjacent the post.

15. The dock of claim 11, wherein the charging station has a circular cross-section.

16. The dock of claim 11, wherein the charging station has a shape that corresponds to a body part upon which the wearable electronic device is to be worn.

17. A dock for charging a battery of a wearable electronic device, the dock comprising:
    a base to support the dock;
    a post cantilevered from the base; and
    a charging station extending from a distal end of the post such that the base is disposed below the charging station, the charging station having a charging surface to support the wearable electronic device, the charging surface askew relative to the base such that a display of the wearable electronic device faces toward a user when the wearable electronic device is supported on the charging surface to facilitate reading the display, the charging station including an inductive charger to wirelessly charge the battery of the wearable electronic device while the wearable electronic device is supported on the charging surface, the charging station having a circular trapezoid shape that corresponds to a body part upon which the wearable electronic device is to be worn.

18. The dock of claim 11, wherein the charging station has a shape corresponding to a watch band wrapped around a wrist.

19. The dock of claim 11, wherein the wearable electronic device is a smart watch.

20. The dock of claim 11, further including circuitry disposed in the base.

* * * * *